US012601461B2

(12) United States Patent
Sato

(10) Patent No.: US 12,601,461 B2
(45) Date of Patent: Apr. 14, 2026

(54) VEHICLE LAMP

(71) Applicant: Stanley Electric Co., Ltd., Tokyo (JP)

(72) Inventor: Koji Sato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/992,707

(22) PCT Filed: Jun. 30, 2023

(86) PCT No.: PCT/JP2023/024320
§ 371 (c)(1),
(2) Date: Jan. 9, 2025

(87) PCT Pub. No.: WO2024/014312
PCT Pub. Date: Jan. 18, 2024

(65) Prior Publication Data
US 2026/0016136 A1 Jan. 15, 2026

(30) Foreign Application Priority Data
Jul. 11, 2022 (JP) ................................ 2022-111121

(51) Int. Cl.
*F21Y 115/30* (2016.01)
*F21S 43/235* (2018.01)
(Continued)

(52) U.S. Cl.
CPC ........... *F21S 43/241* (2018.01); *F21S 43/237* (2018.01); *F21S 43/243* (2018.01); *F21S 43/246* (2024.05);
(Continued)

(58) Field of Classification Search
CPC ........................................................ F21S 41/24
See application file for complete search history.

(56) References Cited

U.S. PATENT DOCUMENTS 4,172,631 A * 10/1979 Yevick .................... G09F 9/305
385/115
5,021,928 A * 6/1991 Daniel .................... B29C 48/07
362/346
(Continued)

FOREIGN PATENT DOCUMENTS

DE 102017106441 A1 9/2018
JP 2013-152895 A 8/2013
(Continued)

OTHER PUBLICATIONS

International Search Report for PCT/JP2023/024320 dated Aug. 8, 2023.

*Primary Examiner* — Eric T Eide
(74) *Attorney, Agent, or Firm* — KENEALY VAIDYA LLP

(57) ABSTRACT

A light guide body has a first light guide part disposed in front of a light source, a second light guide part extending from a front surface side of the first light guide part toward at least one lateral side of the first light guide part, a plurality of third light guide parts branching and extending from a midway portion of the second light guide part, an incidence part located on a back surface side of the first light guide part, and a first emission part located on a tip side of the plurality of third light guide parts, the second light guide part has a shape in which a cross-sectional area gradually decreases toward the tip side, and the plurality of third light guide parts are arranged next to each other in an extension direction of the second light guide part.

12 Claims, 4 Drawing Sheets

(51) Int. Cl.

| | |
|---|---|
| ***F21S 43/237*** | (2018.01) |
| ***F21S 43/241*** | (2018.01) |
| ***F21S 43/242*** | (2018.01) |
| ***F21S 43/243*** | (2018.01) |
| ***F21S 43/247*** | (2018.01) |
| ***F21W 103/15*** | (2018.01) |
| ***F21W 103/20*** | (2018.01) |
| ***F21W 103/35*** | (2018.01) |
| ***F21W 103/45*** | (2018.01) |
| ***F21W 103/55*** | (2018.01) |
| ***F21Y 113/10*** | (2016.01) |
| *F21S 43/14* | (2018.01) |
| *F21W 103/10* | (2018.01) |

(52) U.S. Cl.

CPC ........... *F21S 43/247* (2018.01); *F21S 43/252* (2024.05); *F21S 43/253* (2024.05); *F21S 43/14* (2018.01); *F21W 2103/10* (2018.01); *F21W 2103/15* (2018.01); *F21W 2103/20* (2018.01); *F21W 2103/35* (2018.01); *F21W 2103/45* (2018.01); *F21W 2103/55* (2018.01); *F21Y 2113/10* (2016.08); *F21Y 2115/30* (2016.08)

(56) References Cited

U.S. PATENT DOCUMENTS

| | | | | |
|---|---|---|---|---|
| 2006/0239006 A1* | 10/2006 | Chaves | G02B 27/095 | 257/E33.071 |
| 2009/0064993 A1* | 3/2009 | Ghosh | F24S 23/12 | 126/685 |
| 2010/0220492 A1* | 9/2010 | Richardson | G02B 6/0028 | 362/551 |
| 2015/0078025 A1* | 3/2015 | Kleiner | F21S 43/251 | 362/511 |
| 2023/0043865 A1* | 2/2023 | Wu | F21V 7/06 | |

FOREIGN PATENT DOCUMENTS

| | | |
|---|---|---|
| JP | 2015-022982 A | 2/2015 |
| JP | 2016-024885 A | 2/2016 |
| JP | 2017-092011 A | 5/2017 |

* cited by examiner

VEHICLE LAMP

This application is a U.S. National Stage Application under 35 U.S.C § 371 of International Patent Application No. PCT/JP2023/024320 filed Jun. 30, 2023, which claims the benefit of priority under 35 U.S.C. § 119 to Japanese Patent Application No. 2022-111121 filed Jul. 11, 2022, the disclosures of all of which are hereby incorporated by reference in their entireties.

TECHNICAL FIELD

The present invention relates to a vehicle lamp.

BACKGROUND ART

In the related art, as a vehicle lamp mounted on a vehicle, there is known a configuration in which a light source such as a light emitting diode (LED) or the like, and a rod-shaped or plate-shaped light guide body are combined.

In such a vehicle lamp, light emitted from a light source enters from a base end side of a light guide body, and the light is guided toward a tip side of the light guide body while repeating reflection in the light guide body. In addition, the light reflected by a plurality of reflection cuts provided on a back surface side of the light guide body is emitted from a front surface side of the light guide body. Accordingly, it is possible to emit light in a linear shape or a surface shape from a light emitting section provided on the front surface side of the light guide body.

In addition, in the vehicle lamp, after the light is branched off by a branch part provided on the light guide body, the light is emitted from the light emitting section which is provided from one side to the other side of the light guide body while having the branch part interposed between the one side to the other side of the light guide body (for example, see the following Patent Document 1).

CITATION LIST

Patent Document

Patent Document 1: Japanese Unexamined Patent Application, First Publication No. 2017-92011

SUMMARY OF INVENTION

Technical Problem

Incidentally, in the above-mentioned light guide body, luminance unevenness occurs in the light emitting section due to a difference in optical path length of the light guided from a base end side to a tip side thereof in some cases. That is, when the luminance unevenness occurs in the light emitting section of the light guide body, in the axial direction of the light guide body, a tip side where an optical path length from the light source is long becomes relatively darker than a base end side where the optical path length from the light source is short due to attenuation of the light. Accordingly, such a light and dark luminance is perceived as luminance unevenness in the light emitting section.

For this reason, when the rod-shaped light guide body is made to emit light in a linear shape, the occurrence of the luminance unevenness mentioned above has led to problems such as deterioration in lighting feeling, such as deterioration in the visibility and appearance of the light emitting section.

In addition, when the curved portion in which a part of the light guide body is curved or the branch part is provided between the incidence part and the light emitting section, if the length of the curved portion or the branch part is short and the radius of curvature is small, some of the light guided inside the curved portion or the branch part does not advance to the tip side of the light guide body, and there was a case in which the light leaks out from the curved portion or the branch part as stray light. In this case, the curved portion and a part of the base end side of the branch part appear to shine brighter than the surrounding areas, resulting in a so-called point glow, which deteriorates the appearance of the vehicle lamp when it is lit.

An aspect of the present invention is directed to providing a vehicle lamp capable of preventing occurrence of luminance unevenness and thus improving appearance upon emission.

Solution to Problem

In order to achieve the aforementioned objects, an aspect of the present invention provides the following configurations.

(1) A vehicle lamp including:

a light source; and a light guide body configured to guide light emitted from the light source, wherein the light guide body has:

a first light guide part disposed in front of the light source;

a second light guide part extending from a front surface side of the first light guide part toward at least one lateral side of the first light guide part;

a plurality of third light guide parts branching and extending from a midway portion of the second light guide part;

an incidence part located on a back surface side of the first light guide part and configured to cause the light emitted from the light source to enter an inside of the first light guide part; and a first emission part located on a tip side of the third light guide part and configured to emit the light guided inside the third light guide part to an outside of the third light guide part, the second light guide part has a shape in which a cross-sectional area gradually reduces toward the tip side, and the plurality of third light guide parts are arranged next to each other in an extension direction of the second light guide part.

(2) The vehicle lamp according to the above-mentioned (1), wherein the plurality of third light guide parts have a shape in which each of cross-sectional areas of boundaries between the second light guide part and the plurality of third light guide parts sequentially increases toward the tip side of the second light guide parts.

(3) The vehicle lamp according to the above-mentioned (1), wherein the plurality of third light guide parts have a shape in which each of inclined angles of the plurality of third light guide parts with respect to an axial direction of the second light guide part gradually reduces as it gets closer to the tip side of the second light guide parts.

(4) The vehicle lamp according to the above-mentioned (1), wherein the plurality of third light guide parts constitute the first emission parts having a same shape with each other in a state in which the plurality of third light guide parts extend in a same direction from positions of the second light guide parts other than a front surface side of the second light guide parts and in which each of the tips of the plurality of third light guide parts are facing the front surface side.

(5) The vehicle lamp according to the above-mentioned (1), wherein the light guide body has:

a fourth light guide part extending from a tip of the second light guide part; and a second emission part that is located on a tip side of the fourth light guide part and that is configured to emit the light guided in the fourth light guide part to an outside of the fourth light guide part.

(6) The vehicle lamp according to the above-mentioned (5), wherein the fourth light guide part constitutes the second emission part having the same shape as the first emission part in a state in which the fourth light guide part extends in the same direction as the third light guide part and in which the tip of the fourth light guide part faces the front surface side.

(7) The vehicle lamp according to the above-mentioned (1), wherein the second light guide part is provided so as to extend from the front surface side of the first light guide part to one side and other side on a lateral side with respect to a branch part.

Advantageous Effects of Invention

As described above, according to the aspect of the present invention, it is possible to provide a vehicle lamp capable of preventing occurrence of luminance unevenness and improving appearance upon emission.

DESCRIPTION OF EMBODIMENTS

Figure 1:
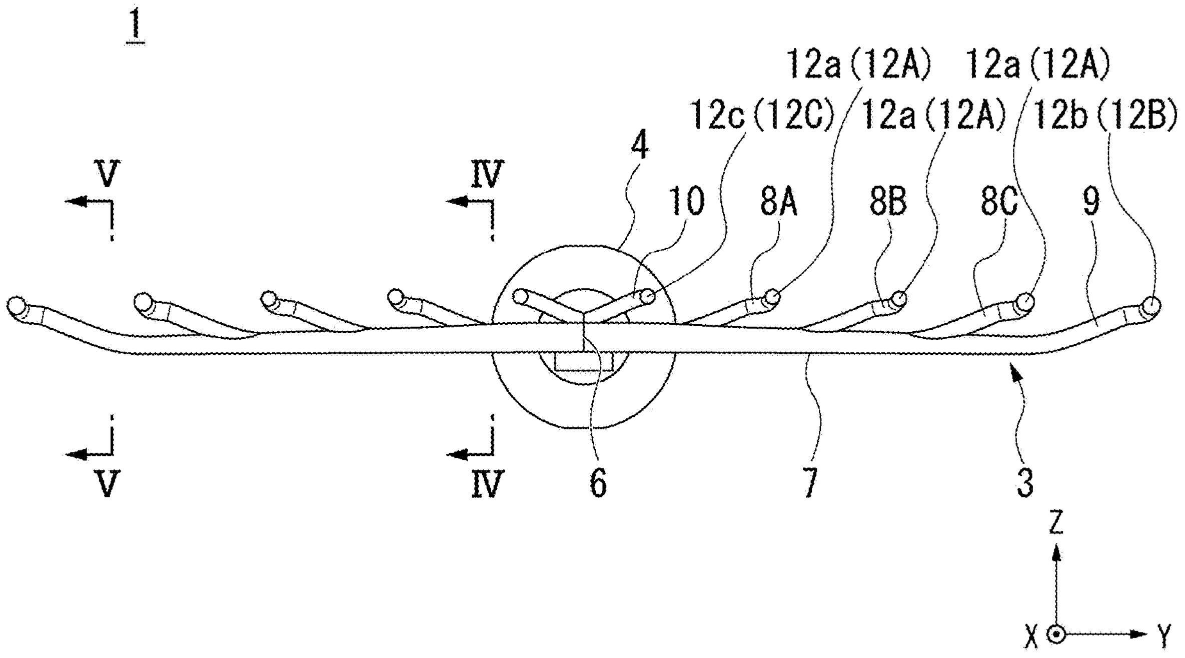
FIG. 1 A front view showing a configuration of a vehicle lamp according to an embodiment of the present invention.

Hereinafter, an embodiment of the present invention will be described with reference to the accompanying drawings in detail.

Further, in the drawings used in the following description, in order to make each component easier to see, the dimensions of each component may be shown on different scales, and the dimensional ratios of each component may not necessarily be the same as in reality.

As an embodiment of the present invention, for example, a vehicle lamp 1 shown in FIG. 1 to FIG. 8 will be described.

Figure 2:
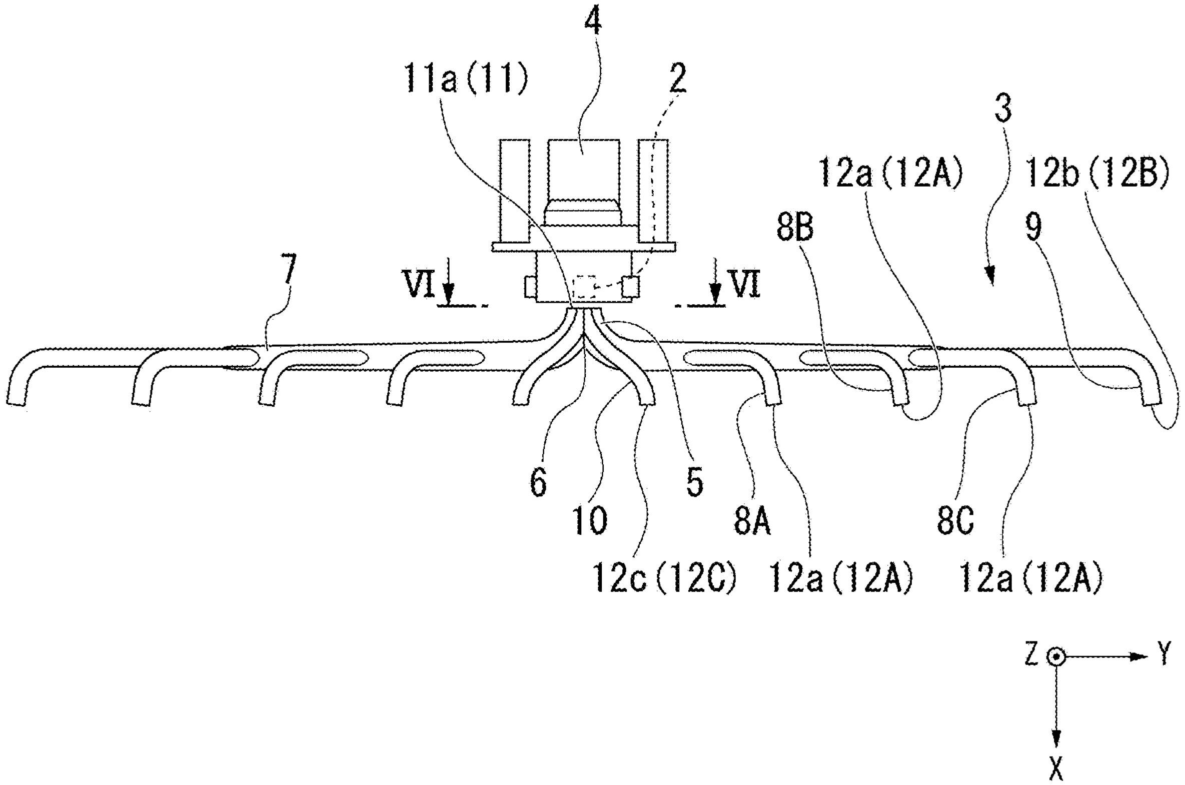
FIG. 2 A plan view showing the configuration of the vehicle lamp shown in FIG. 1.
Figure 3:
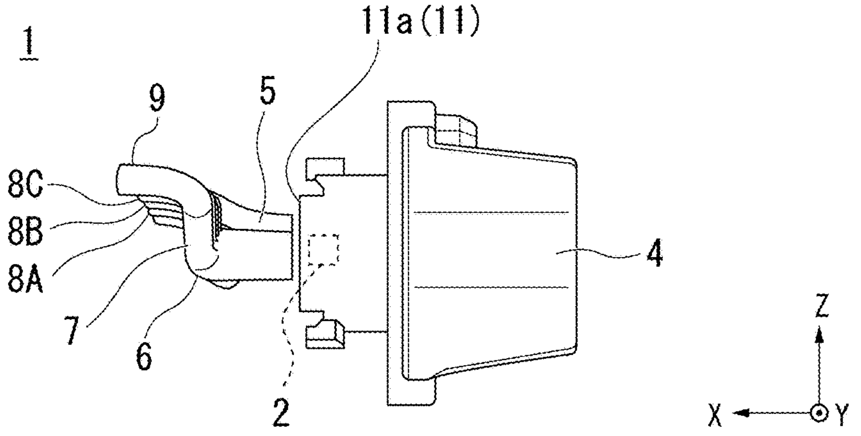
FIG. 3 A side view showing the configuration of the vehicle lamp shown in FIG. 1.
Figure 4:
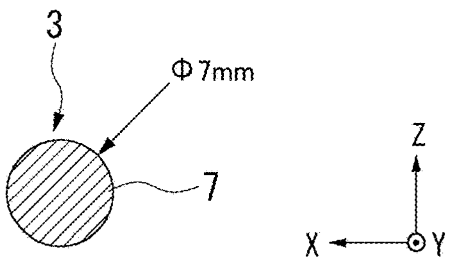
FIG. 4 A cross-sectional view of a light guide body along line segment IV-IV shown in FIG. 1.
Figure 5:
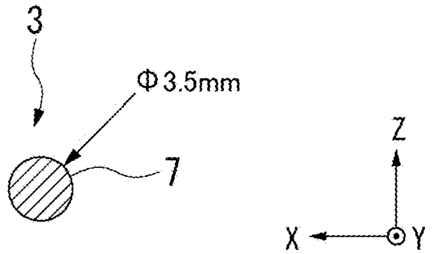
FIG. 5 A cross-sectional view of the light guide body along line segment V-V shown in FIG. 1.
Figure 6:
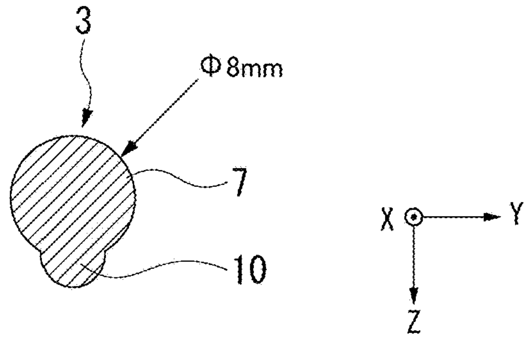
FIG. 6 A cross-sectional view of the light guide body along line segment VI-VI shown in FIG. 2.
Figure 7:
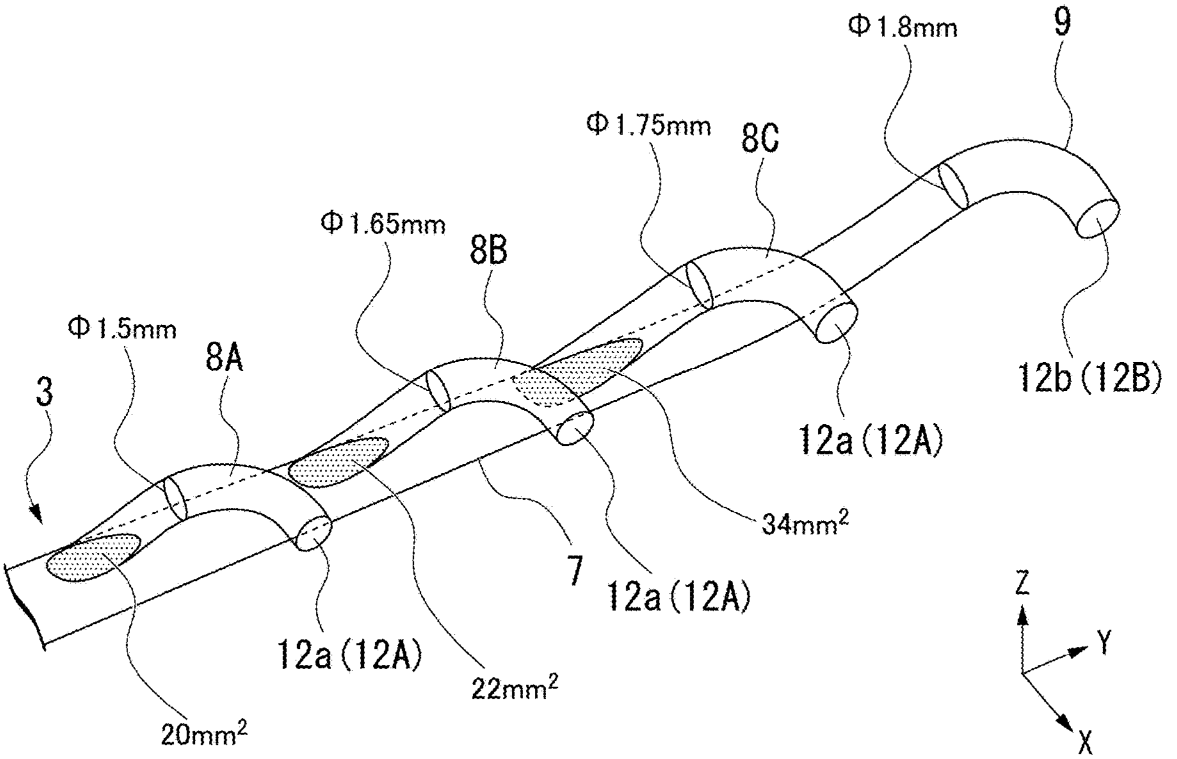
FIG. 7 An enlarged perspective view of a major part of the light guide body included in the vehicle lamp shown in FIG. 1.
Figure 8:
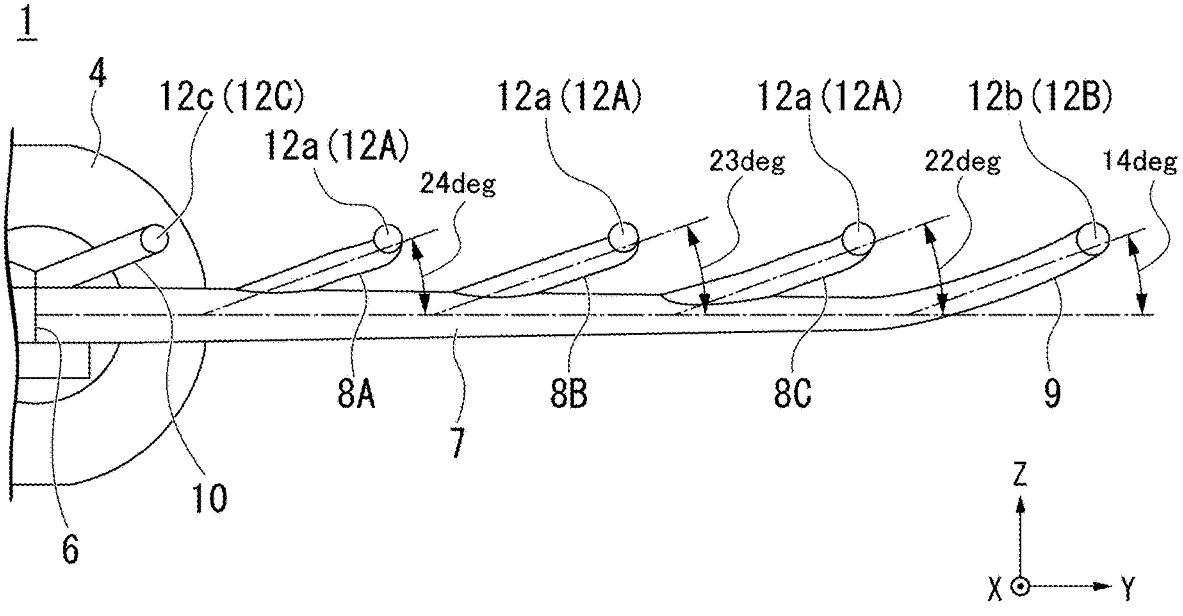
FIG. 8 An enlarged front view of the major part of the light guide body included in the vehicle lamp shown in FIG. 1.

Further, FIG. 1 is a front view showing a configuration of the vehicle lamp 1. FIG. 2 is a plan view showing a configuration of the vehicle lamp 1. FIG. 3 is a side view showing a configuration of the vehicle lamp 1. FIG. 4 is a cross-sectional view of a light guide body 3 along line segment IV-IV shown in FIG. 1. FIG. 5 is a cross-sectional view of the light guide body 3 along line segment V-V shown in FIG. 1. FIG. 6 is a cross-sectional view of the light guide body 3 along line segment VI-VI shown in FIG. 2. FIG. 7 is an enlarged perspective view of a major part of the light guide body 3 provided in the vehicle lamp 1. FIG. 8 is an enlarged front view of a major part of the light guide body 3 provided in the vehicle lamp 1.

In addition, in the drawings described below, an XYZ orthogonal coordinate system is set, an X-axis direction indicates a forward/rearward direction (lengthwise direction) of the vehicle lamp 1, a Y-axis direction indicates a leftward/rightward direction (widthwise direction) of the vehicle lamp 1, and a Z-axis direction indicates an upward/downward direction (height direction) of the vehicle lamp 1.

As shown in FIG. 1 to FIG. 3, the vehicle lamp 1 of the embodiment includes a light source 2 and the light guide body 3 configured to guide light emitted from the light source 2, and has a structure in which they are disposed inside a lighting body (not shown).

Further, the lighting body is constituted by a housing with a front surface that is open, and a transparent outer lens (cover lens) configured to cover an opening of the housing. In addition, the shape of the lighting body can be appropriately changed according to a design or the like of the vehicle.

In addition, the vehicle lamp 1 of the embodiment includes a coupler socket 4 in which the light source 2 is disposed. The coupler socket 4 is detachably attached to surroundings of an attachment hole provided in the housing while being inserted into the lighting body from the attachment hole.

The light source 2 is constituted by at least one or a plurality of LEDs, is mounted on a surface of a circuit board (not shown) on which a driving circuit configured to drive the LED is provided, and emits light forward radially.

Further, in the embodiment, while the coupler socket 4 in which the above-mentioned light source 2 is disposed is provided, there is no limitation to this configuration, and a circuit board on which the light source 2 is disposed may be disposed inside the lighting body.

The light guide body 3 is made of a light-transmitting member such as a transparent resin such as polycarbonate or acryl, or glass, and is disposed in front of the light source 2 (the coupler socket 4).

The light guide body 3 has a long round bar shape extending symmetrically in the vehicle width direction (horizontal direction) with respect to the light source 2 (the coupler socket 4). For example, since the light guide body 3 basically has the same configuration on both sides in the vehicle width direction with respect to the central portion, the configuration on one side with respect to the central portion (the right side in this embodiment) will be used as an example to describe the configuration.

The light guide body 3 has a first light guide part 5 disposed in front of the light source 2, a pair of second light guide parts 7 that are provided so as to extend from a front surface side of the first light guide part 5 toward one side and the other side with respect to a branch part 6, a plurality of (in the embodiment, three) third light guide parts 8A, 8B and 8C extended to be branched off from a midway portion of the second light guide parts 7, fourth light guide parts 9 extended from tips of the second light guide parts 7, and fifth light guide parts 10 extended to be branched off from the base end (the branch part 6) of the second light guide parts 7.

The fifth light guide parts 10, the plurality of third light guide parts 8A, 8B and 8C and the fourth light guide parts 9 are arranged in an extension direction of the second light guide parts 7 from a base end side toward a tip side of the second light guide parts 7.

In addition, the fifth light guide part 10, the plurality of third light guide parts 8A, 8B and 8C and the fourth light guide parts 9 extend in the same direction from positions of the second light guide part 7 other than the front surface side of the second light guide part 7, and are made in a state in which each of the tips of the fifth light guide part 10, the plurality of third light guide parts 8A, 8B and 8C and the fourth light guide parts 9 are facing the front surface side. In the embodiment, a state in which each of the tips of the fifth light guide part 10, the plurality of third light guide parts 8A, 8B and 8C and the fourth light guide parts 9 are made to face the front surface side is made by extending the tips of the fifth light guide part 10, the plurality of third light guide parts 8A, 8B and 8C and the fourth light guide parts 9 diagonally upward from upper portions of the second light guide part 7 and then bending the tips of the fifth light guide part 10, the plurality of third light guide parts 8A, 8B and 8C and the fourth light guide parts 9 toward the front surface side.

The light guide body 3 has an incidence part 11 located on a back surface side of the first light guide part, a plurality of (in the embodiment, three) first emission parts 12A located on tip sides of the plurality of third light guide parts 8A, 8B and 8C, respectively, second emission parts 12B located on tip sides of the fourth light guide parts 9, and third emission parts 12C located on tip sides of the fifth light guide parts 10.

The incidence part 11 has a flat (planar) incidence surface 11*a* located on a back surface side of the first light guide part 5 and facing the light source 2. The incidence part 11 causes the light emitted from the light source 2 to enter the inside of the first light guide part 5 (the light guide body 3) through the incidence surface 11*a*. In addition, the light entering from the incidence part 11 is guided inside the first light guide part 5 toward the branch part 6 on the front surface side of the first light guide part 5.

Further, the incidence part 11 is not limited to a configuration having the above-mentioned flat (planar) incidence surface 11*a*, but may be configured to have a lens shape that collimates or focuses the light radially emitted from the light source 2 and enters the inside of the first light guide part 5.

The branch part 6 is located on the front surface side of the first light guide part 5 and is the part where the pair of second light guide parts 7 branch off while curving in opposite directions, and the branch part 6 reflects the light guided toward the front surface side of the first light guide part 5 while branching the light toward the pair of second light guide parts 7.

Accordingly, the light reflected toward the pair of second light guide parts 7 is guided from the base end side toward the tip side of the second light guide parts 7. In addition, the light guided through the inside of the second light guide parts 7 is branched off to the fifth light guide parts 10, the plurality of third light guide parts 8A, 8B and 8C and the fourth light guide parts 9 and are guided toward the tip sides of the fifth light guide parts 10, the plurality of third light guide parts 8A, 8B and 8C and the fourth light guide parts 9.

The first emission parts 12A are located on the tip sides (the front surface side of the light guide body 3) of the plurality of third light guide parts 8A, 8B and 8C, and have flat (planar) first emission surfaces 12*a*. The second emission parts 12B are located on the tip sides (the front surface side of the light guide body 3) of the fourth light guide parts 9, and have flat (planar) second emission surfaces 12*b*. The third emission parts 12C are located on the tip sides (the front surface side of the light guide body 3) of the fifth light guide parts 10, and have flat (planar) third emission surfaces 12*c*. The first, second and third emission parts 12A, 12B and 12C have the first, second and third emission surfaces 12*a*, 12*b* and 12*c* having circular shapes that are the same as each other.

The first, second and third emission parts 12A, 12B and 12C emit the light, which are guided toward the tip sides thereof, from the first, second and third emission surfaces 12*a*, 12*b* and 12*c* to the outside (forward). Accordingly, each of the emission surfaces 12*a*, 12*b* and 12*c* (the first, second and third emission parts 12A, 12B and 12C) can be made to emit light as a light emitting section of the vehicle lamp 1.

In the vehicle lamp 1 having the above-mentioned configuration, by emitting the light emitted from the single light source 2 from the plurality of emission parts 12A, 12B and 12C of the light guide body 3, it is possible to create the emission similar to that of multiple lamps having a plurality of light sources.

Incidentally, the light guide body 3 of this embodiment is configured to divide (distribute) the light emitted from the light source 2 approximately uniformly to the first, second and third emission parts 12A, 12B and 12C, so that the above-mentioned first, second and third emission parts 12A, 12B and 12C emit light with uniform brightness (luminance).

Specifically, as shown in FIG. 4 to FIG. 8, the light guide body 3 has a shape in which a cross-sectional area (diameter) of the second light guide part 7 is gradually reduced toward the tip side. For example, in the embodiment, a diameter of the second light guide part 7 shown in FIG. 4 is Φ 7 mm, a diameter of the second light guide part 7 shown in FIG. 5 is Φ 3.5 mm, and a diameter of the second light guide part 7 shown in FIG. 6 is Φ 8 mm.

In the light guide body 3, by giving the second light guide part 7 such a cross-sectional shape, the total reflection angle increases toward the tip of the second light guide part 7, making it easier to guide the light from the second light guide part 7 toward the plurality of third light guide parts 8A, 8B and 8C and the fourth light guide parts 9.

In addition, the light guide body 3 has a shape in which the cross-sectional areas (diameters) of each of the plurality of third light guide parts 8A, 8B and 8C and the fourth light guide parts 9 gradually increases as it is closer to the tip side of the second light guide part 7. For example, in the embodiment, at a portion of each of the plurality of third light guide parts 8A, 8B and 8C and the fourth light guide parts 9 in which the diameter of the plurality of third light guide parts 8A, 8B and 8C and the fourth light guide parts 9 is constant, the diameter gets greater in the order of Φ 1.5 mm, Φ 1.65 mm, Φ 1.75 mm, and Φ 1.8 mm, respectively.

In the light guide body 3, by giving the plurality of third light guide parts 8A, 8B and 8C and the fourth light guide parts 9 such a cross-sectional shape, it is possible to gradually increase the amount of light absorbed into the plurality of third light guide parts 8A, 8B and 8C and the fourth light guide parts 9.

In addition, the light guide body 3 has a shape in which each of the cross-sectional areas of boundaries between the second light guide part 7 and the plurality of third light guide parts 8A, 8B and 8C are sequentially increased toward the tip side of the second light guide part 7. For example, in the embodiment, in each of the boundaries between the second light guide part 7 and the plurality of third light guide parts 8A, 8B and 8C, the cross-sectional area gets greater in the order of 20 $mm^2$, 22 $mm^2$, and 34 $mm^2$, respectively.

In the light guide body 3, by giving the plurality of third light guide parts 8A, 8B and 8C such a cross-sectional shape, it is possible to gradually increase the amount of light entering into the plurality of third light guide parts 8A, 8B and 8C.

In addition, the light guide body 3 has a shape in which each of the plurality of third light guide parts 8A, 8B and 8C and the fourth light guide parts 9 has inclined angles that are sequentially reduced with respect to the axial direction of the second light guide part 7 as it gets closer to the tip side of the second light guide part 7. For example, in the embodiment, each of the inclined angles of the plurality of third light guide parts 8A, 8B and 8C and the fourth light guide parts 9 gets smaller in the order of 24 deg, 23 deg, 22 deg, and 14 deg.

In the light guide body 3, by setting the plurality of third light guide parts 8A, 8B and 8C and the fourth light guide parts 9 at such inclined angles, it is possible to gradually increase the amount of light entering into the plurality of third light guide parts 8A, 8B and 8C and the fourth light guide parts 9.

As described above, in the vehicle lamp 1 of the embodiment, by using the light guide body 3 described above, the light emitted from the light source 2 can be divided (distributed) approximately uniformly to the first, second and third emission parts 12A, 12B and 12C, making it possible for the first, second and third emission parts 12A, 12B and 12C to emit light with uniform brightness (luminance).

Accordingly, in the vehicle lamp 1 of the embodiment, it is possible to improve the appearance upon emission while preventing the occurrence of luminance unevenness.

Further, as for the third emission part 12C of the fifth light guide part 10, unlike the light guided from the branch part 6 toward the second light guide part 7, it uses the light that goes directly from the branch part 6 to the fifth light guide parts 10. For this reason, as for the third emission part 12C, the light intensity is adjusted separately from the first emission parts 12A and the second emission parts 12B to achieve uniform brightness (luminance).

In addition, as for the second emission parts 12B of the fourth light guide parts 9, the light intensity is adjusted together with the first emission parts 12A of the plurality of third light guide parts 8A, 8B and 8C described above to achieve uniform brightness (luminance), but it is also possible to adjust the light intensity separately from the first emission parts 12A of the plurality of third light guide parts 8A, 8B and 8C.

Further, the present invention is not necessarily limited to the above-mentioned embodiment, and various modifications can be made without departing from the scope of the present invention.

Figure 9:
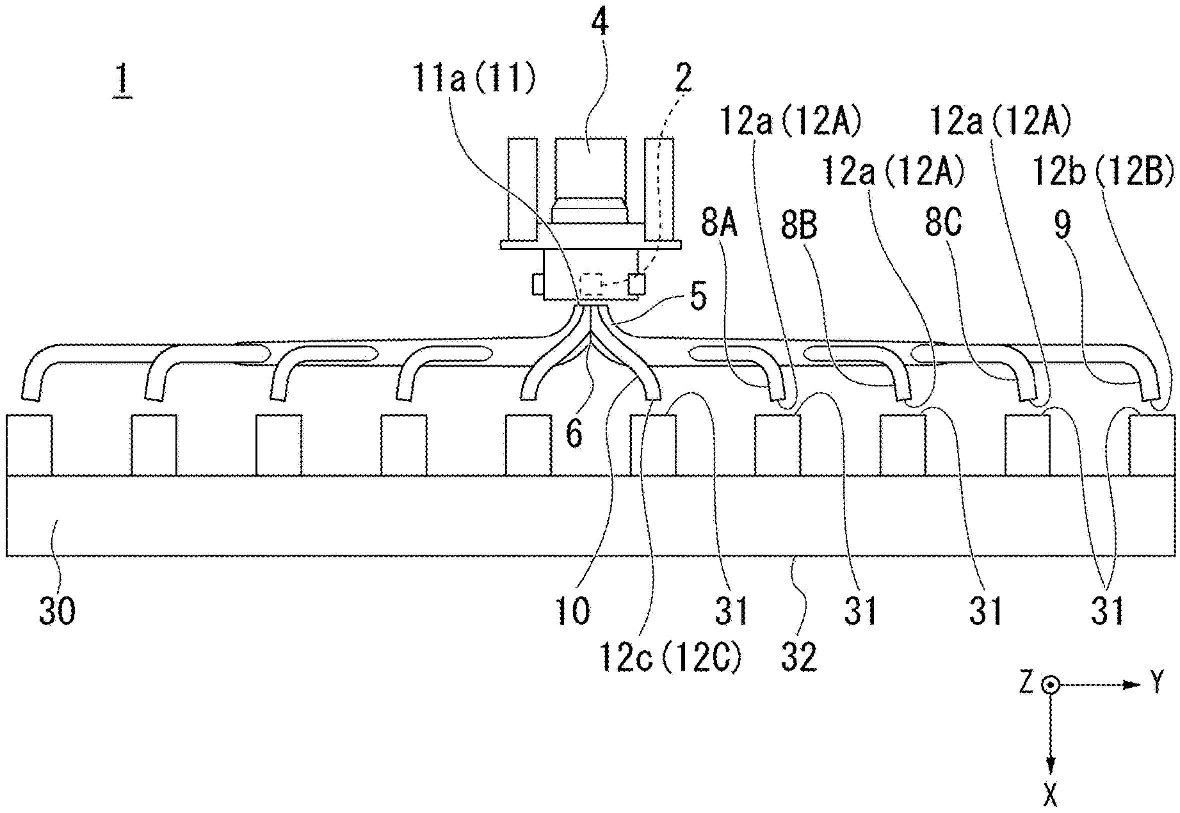
FIG. 9 A plan view showing a configuration in which a light guide lens is added to the vehicle lamp shown in FIG. 1.

Specifically, in the vehicle lamp 1, for example, a light guide lens 30 shown in FIG. 9 may be disposed in front of the light guide body 3.

A plurality of incidence parts 31, into which the light emitted from the first, second and third emission parts 12A, 12B and 12C enters, are provided on the back surface side of the light guide lens 30 so as to protrude opposite each of the plurality of emission parts 12. Meanwhile, a diffusion emission surface 32 configured to diffuse and emit the light entering from the plurality of incidence parts 31 is provided on the front surface side of the light guide lens 30.

In this way, in the vehicle lamp 1, a separate optical member can be disposed in front of the light guide body 3.

Figure 10:
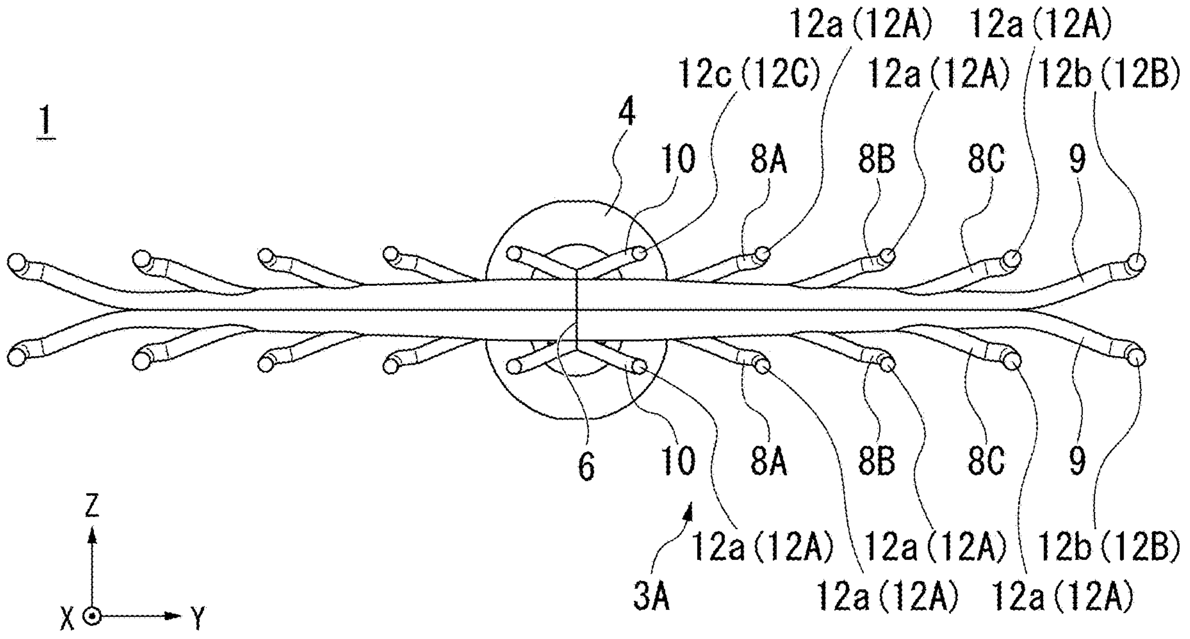
FIG. 10A front view showing a variant of the light guide body included in the vehicle lamp shown in FIG. 1.

In addition, the vehicle lamp 1 may be configured to have, for example, a light guide body 3A as shown in FIG. 10, instead of the light guide body 3 described above. That is, the light guide body 3A is configured such that the fifth light guide part 10, the plurality of third light guide parts 8A, 8B and 8C, and the fourth light guide part 9 extend from the upper and lower parts of the second light guide parts 7. Accordingly, it is possible to increase the number of the first, second and third emission parts 12A, 12B and 12C.

In addition, the light guide body to which the present invention is applied is not necessarily limited to the configuration having the pair of second light guide parts 7 extended to one side and the other side with respect to the branch part 6 described above, but may be any configuration having the second light guide parts 7 extended from the front surface side of the first light guide part 5 toward at least one lateral side.

In addition, the first, second and third emission parts 12A, 12B and 12C are not necessarily limited to having the first, second and third emission surfaces 12*a*, 12*b* and 12*c* having the same circular shape as described above, and the shapes can be changed as appropriate, and it is also possible for the shapes to be different from each other. Further, the orientations of the first, second and third emission parts 12A, 12B and 12C can also be changed as appropriate.

Further, the vehicle lamp to which the present invention is applied is not particularly limited, and the present invention can be widely applied to, for example, tail lights (tail lamps), position lights (position lamps), brake lamps, back lamps, daytime running lamps (DRLs), turn signal lights (winker lamps), side marker lamps, or the like.

In addition, the light source 2 may be anything that emits light radially, and in addition to the LED mentioned above, light emitting elements such as laser diodes (LD) may also be used. In addition, the color of the light emitted by the light source 2 can be changed appropriately depending on the use of the vehicle lamp, such as red, white, or orange.

In addition, although the present invention is suitable for use in the vehicle lamp described above, it can also be applied to uses other than vehicle lamps, such as general lighting.

REFERENCE SIGNS LIST

- 1 Vehicle lamp
- 2 Light source
- 3, 3A Light guide body
- 4 Coupler socket
- 5 First light guide part
- 6 Branch part
- 7 Second light guide part
- 8A, 8B, 8C Third light guide part
- 9 Fourth light guide part
- 10 Fifth light guide part
- 11 Incidence part
- 12A First emission part
- 12B Second emission part

12C Third emission part

30 Light guide lens

The invention claimed is:

1. A vehicle lamp comprising:

a light source; and a light guide body configured to guide light emitted from the light source, wherein the light guide body has:

a first light guide part disposed in front of the light source;

a second light guide part extending from a front surface side of the first light guide part toward at least one lateral side of the first light guide part;

a plurality of third light guide parts branching and extending from a midway portion of the second light guide part;

an incidence part located on a back surface side of the first light guide part and configured to cause the light emitted from the light source to enter an inside of the first light guide part; and a first emission part located on a tip side of the third light guide part and configured to emit the light guided inside the third light guide part to an outside of the third light guide part, the second light guide part has a shape in which a cross-sectional area gradually reduces toward the tip side, and the plurality of third light guide parts are arranged next to each other in an extension direction of the second light guide part, wherein the plurality of third light guide parts have a shape in which each of inclined angles of the plurality of third light guide parts with respect to an axial direction of the second light guide part gradually reduces as it gets closer to the tip side of the second light guide parts.

2. The vehicle lamp according to claim 1, wherein the plurality of third light guide parts have a shape in which each of cross-sectional areas of boundaries between the second light guide part and the plurality of third light guide parts sequentially increases toward the tip side of the second light guide parts.

3. The vehicle lamp according to claim 1, wherein the plurality of third light guide parts constitute the first emission parts having a same shape with each other in a state in which the plurality of third light guide parts extend in a same direction from positions of the second light guide parts other than a front surface side of the second light guide parts and in which each of the tips of the plurality of third light guide parts are facing the front surface side.

4. The vehicle lamp according to claim 1, wherein the light guide body has:

a fourth light guide part extending from a tip of the second light guide part; and a second emission part that is located on a tip side of the fourth light guide part and that is configured to emit the light guided in the fourth light guide part to an outside of the fourth light guide part.

5. The vehicle lamp according to claim 4, wherein the fourth light guide part constitutes the second emission part having the same shape as the first emission part in a state in which the fourth light guide part extends in the same direction as the third light guide part and in which the tip of the fourth light guide part faces the front surface side.

6. The vehicle lamp according to claim 1, wherein the second light guide part is provided so as to extend from the front surface side of the first light guide part to one side and other side on a lateral side with respect to a branch part.

7. A vehicle lamp comprising:

a light source; and a light guide body configured to guide light emitted from the light source, wherein the light guide body has:

a first light guide part disposed in front of the light source;

a second light guide part extending from a front surface side of the first light guide part toward at least one lateral side of the first light guide part;

a plurality of third light guide parts branching and extending from a midway portion of the second light guide part;

an incidence part located on a back surface side of the first light guide part and configured to cause the light emitted from the light source to enter an inside of the first light guide part; and a first emission part located on a tip side of the third light guide part and configured to emit the light guided inside the third light guide part to an outside of the third light guide part, the second light guide part has a shape in which a cross-sectional area gradually reduces toward the tip side, and the plurality of third light guide parts are arranged next to each other in an extension direction of the second light guide part, wherein the plurality of third light guide parts constitute the first emission parts having a same shape with each other in a state in which the plurality of third light guide parts extend in a same direction from positions of the second light guide parts other than a front surface side of the second light guide parts and in which each of the tips of the plurality of third light guide parts are facing the front surface side.

8. The vehicle lamp according to claim 7, wherein the plurality of third light guide parts have a shape in which each of cross-sectional areas of boundaries between the second light guide part and the plurality of third light guide parts sequentially increases toward the tip side of the second light guide parts.

9. The vehicle lamp according to claim 1, wherein the plurality of third light guide parts have a shape in which each of inclined angles of the plurality of third light guide parts with respect to an axial direction of the second light guide part gradually reduces as it gets closer to the tip side of the second light guide parts.

10. The vehicle lamp according to claim 7, wherein the light guide body has:

a fourth light guide part extending from a tip of the second light guide part; and a second emission part that is located on a tip side of the fourth light guide part and that is configured to emit the light guided in the fourth light guide part to an outside of the fourth light guide part.

11. The vehicle lamp according to claim 10, wherein the fourth light guide part constitutes the second emission part having the same shape as the first emission part in a state in which the fourth light guide part extends in the same direction as the third light guide part and in which the tip of the fourth light guide part faces the front surface side.

12. The vehicle lamp according to claim 7, wherein the second light guide part is provided so as to extend from the front surface side of the first light guide part to one side and other side on a lateral side with respect to a branch part.

* * * * *